(12) United States Patent
Brissette et al.

(10) Patent No.: US 7,062,165 B2
(45) Date of Patent: Jun. 13, 2006

(54) RECEIVER MONITORING AND OPTIMIZATION USING FORWARD ERROR CORRECTION INFORMATION

(75) Inventors: Patrice Brissette, Hull (CA); Sandy A. Thomson, Ottawa (CA)

(73) Assignee: Nortel Networks Limited, Ottawa (CA)

( * ) Notice: Subject to any disclaimer, the term of this patent is extended or adjusted under 35 U.S.C. 154(b) by 784 days.

(21) Appl. No.: 10/025,795

(22) Filed: Dec. 26, 2001

(65) Prior Publication Data

US 2004/0091273 A1    May 13, 2004

(51) Int. Cl.
*H04B 10/08* (2006.01)
(52) U.S. Cl. .......................... 398/27; 398/209
(58) Field of Classification Search .............. 398/209, 398/27, 25; 714/704–708, 709, 750, 760, 714/774
See application file for complete search history.

(56) References Cited

U.S. PATENT DOCUMENTS

| | | | | |
|---|---|---|---|---|
| 4,823,360 A | | 4/1989 | Tremblay et al. ............ 375/214 |
| 5,455,536 A | * | 10/1995 | Kono et al. ................... 329/325 |
| 5,896,391 A | | 4/1999 | Solheim et al. .............. 714/704 |
| 5,896,392 A | | 4/1999 | Ono et al. ..................... 714/705 |
| 6,583,903 B1 | * | 6/2003 | Way et al. ..................... 398/152 |
| 6,877,117 B1 | | 4/2005 | Childers et al. ............ 714/704 |
| 6,885,828 B1 | * | 4/2005 | Cornelius ..................... 398/209 |
| 2003/0120799 A1 | * | 6/2003 | Lahav et al. .................. 709/236 |

FOREIGN PATENT DOCUMENTS

| | | |
|---|---|---|
| EP | 1 085 713 | 3/2001 |
| JP | 03 239081 | 10/1991 |
| WO | WO 99/12315 | 3/1999 |

OTHER PUBLICATIONS

European Search Report corresponding to European Application Serial No. EP 02 25 8783 dated Feb. 11, 2005.

* cited by examiner

*Primary Examiner*—Christina Y Leung
(74) *Attorney, Agent, or Firm*—Ridout & Maybee LLP

(57) ABSTRACT

A data regenerator for regenerating a data signal, including a convertor for converting a received data signal into a binary data signal in dependence on conversion parameters, an error corrector for correcting errors in the binary data signal based on error correction code contained in the binary data signal to produce a corrected binary data signal, and a performance monitor for comparing the corrected binary data signal with an uncorrected representation of the binary data signal to determine information about the relative number of logic "1"s and logic "0"s that have been corrected by the error corrector and output a feedback signal representative of the relative number, wherein the convertor adjusts at least some of the conversion parameters in dependance on the feedback signal.

16 Claims, 3 Drawing Sheets

RECEIVER MONITORING AND OPTIMIZATION USING FORWARD ERROR CORRECTION INFORMATION

FIELD OF THE INVENTION

This invention relates to receivers for regenerating binary data signals, and more particularly to receivers that use forward error correction information to monitor and adjust regeneration of binary data signals.

BACKGROUND OF THE INVENTION

It is well known that transmitted signals suffer degradation from such factors as noise, inter-symbol interference, and distortion during transmission, and that the extent of such degradation can be represented in an eye closure diagram, which is essentially a plot of signal amplitude against time. For a binary data signal, such a diagram has a single eye which is open or closed to an extent determined by the signal degradation. For optimum regeneration of the signal, it is desired to sample the signal with respect to an amplitude decision or threshold level and at a time positioned optimally within the open part of the eye closure diagram.

Transmission rates of data in communications systems have increased dramatically in recent years, and continue to increase. Additionally, the length of fiber links in networks also continues to increase. Both of these factors can contribute to increased signal degradation that must be compensated for when the transmitted signal is regenerated.

In order to assist in error detection, some standards, for example, those that pertain to Synchronous Data Hierarchy (SDH), have allowed for basic performance monitoring through error detection methods such as Bit-Interleaved Parity-8 (BIP-8), in which parity checks are performed on one-byte groups. More recent standards that have or are being devised for optical networks (for example, ITU-T G.709) provide for overhead that includes extensive forward error correction (FEC) data for use in regeneration of degraded signals.

Various systems have been proposed in which receiver regeneration performance is monitored and the results used in optimization routines in an attempt to lower the Bit Error Rate (BER) in such systems. For example, in U.S. Pat. No. 5,896,391 issued Apr. 20, 1999, to Solheim et al. and assigned to Northern Telecom, forward error correction assisted receiver optimization is disclosed. However, such proposals have focussed on monitoring performance based on the magnitude of the BER, rather than distinguishing between the types of errors that are occurring.

It is therefore desirable to provide a receiver having performance monitoring and correction capabilities in which the types of errors that occur are considered.

SUMMARY OF THE INVENTION

According to embodiments of the present invention, there is provided a data regenerator that compares the number of corrected logic "1"s and "0"s in an incoming data signal, and adjusts the slicing level performed in respect of the incoming signals so that the ratio of corrected logic "1"s and "0"s tends towards an optimal balance. By considering the type of errors being corrected, rather than just the number of errors, the present invention provides for improved optimization of the "eye" parameters of the data regenerator.

According to one aspect of the invention, there is provided a data regenerator for regenerating a data signal, including a convertor for converting a received data signal into a binary data signal in dependence on conversion parameters, an error corrector for correcting errors in the binary data signal based on error correction code contained in the binary data signal to produce a corrected binary data signal, and a performance monitor for comparing the corrected binary data signal with an uncorrected representation of the binary data signal to determine information about the relative number of logic "1"s and logic "0"s that have been corrected by the error corrector and output a feedback signal representative of said information. The convertor adjusts at least some of the conversion parameters in dependence on the feedback signal.

According to another aspect of the invention, there is provided a method for regenerating a binary data signal that includes steps of converting a received data signal into a binary data signal according to conversion parameters, detecting and correcting errors in the binary data signal based on detection and correction code included in the binary data signal to produce a corrected binary data signal, comparing the corrected binary data signal with an uncorrected representation of the binary data signal to determine information about the relative number of logic "1"s and "0"s that have been corrected, and adjusting at least one of the conversion parameters in dependence on the determined information.

According to still a further aspect of the present invention, there is provided a performance monitoring device for monitoring the performance of a data regenerator that corrects a received data signal based on forward error correction information contained in the received data signal. The performance monitoring device includes comparison means for receiving a corrected binary data signal and an uncorrected binary data signal from the data regenerator and performing a bit-by-bit comparison of the corrected and uncorrected binary data signals to determine when a logic "1" has been corrected to a logic "0" and when a logic "0" has been corrected to a logic "1" by the data regenerator, and signal generating means responsive to the comparison means for generating a signal representative of the ratio of corrected logic "1"s and logic "0"s.

Other aspects and features of the present invention will become apparent to those ordinarily skilled in the art upon review of the following description of specific embodiments of the invention in conjunction with the accompanying figures.

DESCRIPTION OF THE PREFERRED EMBODIMENTS

Figure 1:
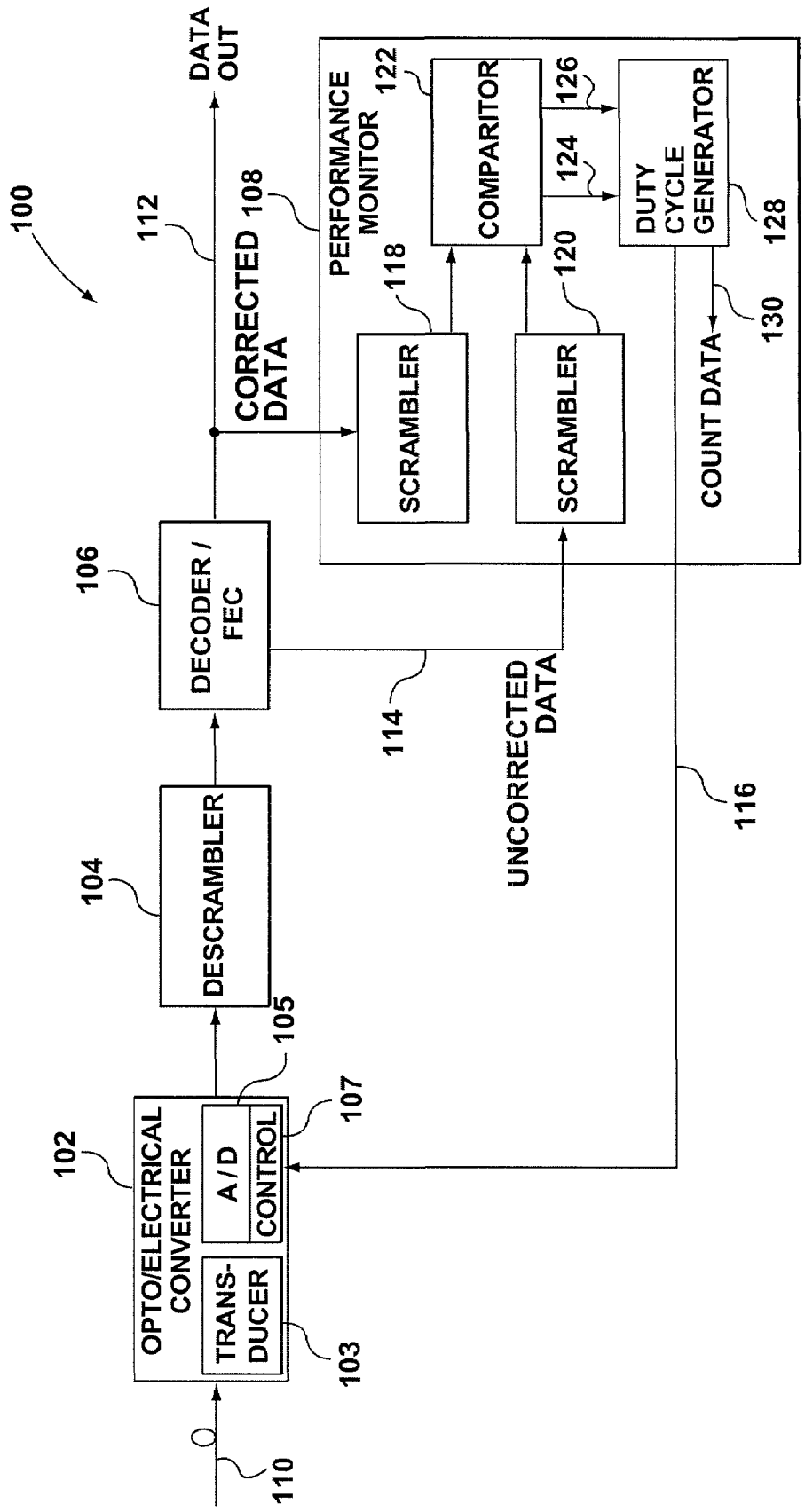
FIG. 1 is a block diagram of a data regenerator in accordance with embodiments of the present invention.

FIG. 1 shows a block diagram of a data regenerator 100, in accordance with one preferred embodiment of the invention, that includes a opto/electrical converter 102, a descrambler 104, a decoder 106, and a performance monitor 108. The opto/electrical converter 102 is connected to receive an optical signal from a transmitter over an optical fiber path 110, which may include optical amplifiers, optical filters, dispersion compensating modules, and other active and passive optical connecters as may be deployed between a transmitter and receiver. The opto/electrical converter 102 is configured to convert an incoming optical signal into a discrete binary electrical data signal, and in this regard includes an optical/electrical transducer 103 that performs conventional amplification and conversion of the optical incoming signal to an analog electrical signal, using conventional techniques. The opto/electrical converter 102 further includes an analog-to-digital converter 105 for sampling and converting the analog electrical signal into a digital data signal.

Figure 2:
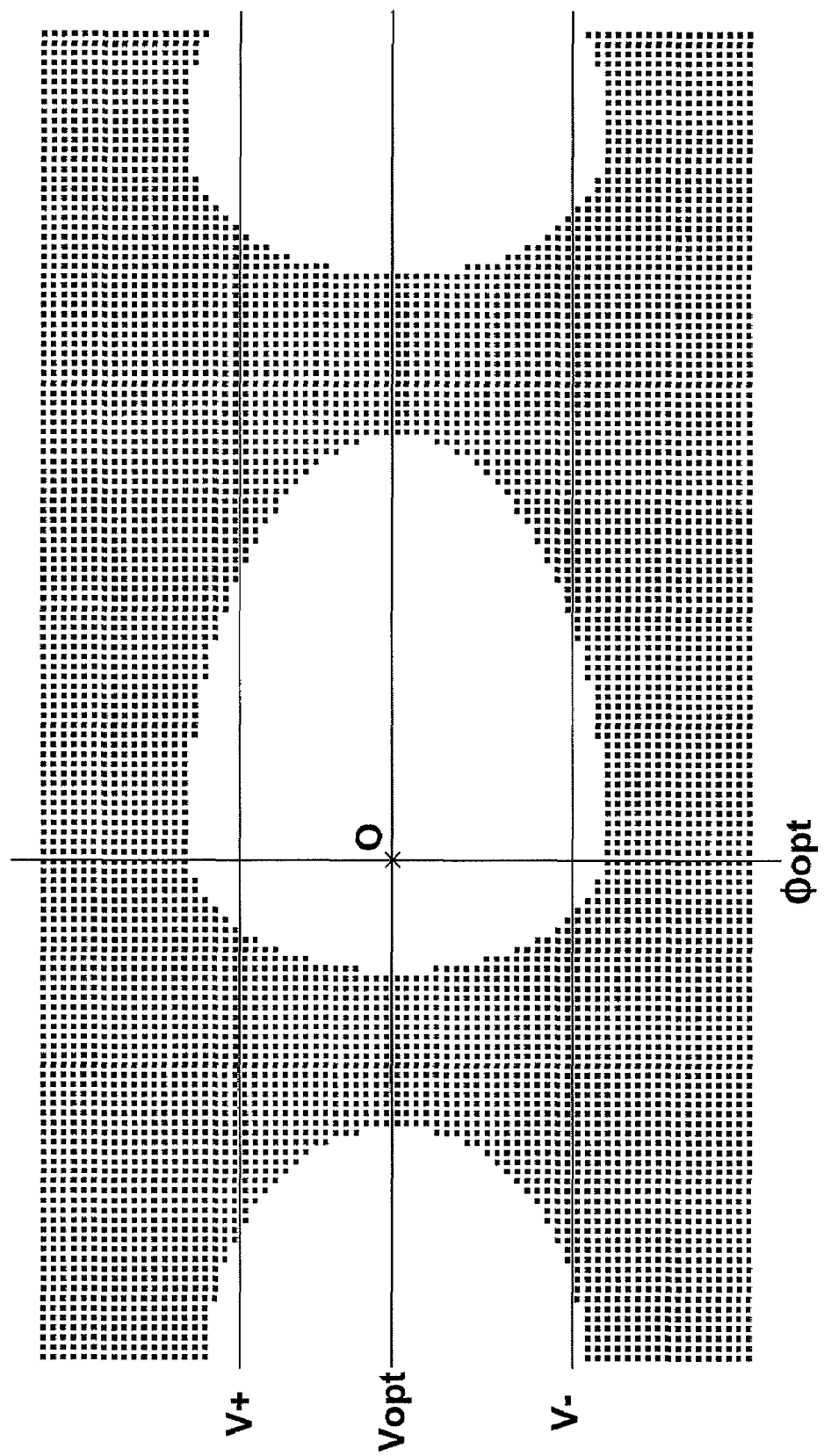
FIG. 2 is a representative eye-closure diagram for a digital signal.

An exemplary eye closure diagram illustrating parameters used by the opto/electrical converter 102 for regeneration of data received over the optical path 110 is shown in FIG. 2. The vertical coordinate of the eye closure diagram represents the amplitude of the data-in-signal, and the horizontal coordinate represents time. $V_+$ and $V_-$ are voltage levels associated with the lowest inner upper level and the highest inner lower level of the data-in-signal. The desired operation point for the analog-to-digital converter of the opto/electrical converter has the coordinates $\phi_{opt}$ and $V_{opt}$, where $\phi_{opt}$ represents an optimum sampling phase providing an acceptable phase margin to accommodate phase jitter, and $V_{opt}$ represents an optimum slicing level for deciding if the level of the incoming signal represents a logic "1" or "0". Both $\phi_{opt}$ and $V_{opt}$ depend on the transmission equipment specification. As will be explained in greater detail below, according to the present invention, optimization of the selection of the slicing level V and sampling phase $\phi$ and of the analog to digital converter 105 of the opto/electrical converter 102 is effected based on feedback from the performance monitor 108.

In one embodiment of the invention, The raw binary data signal output from the opto/electrical converter 102 is provided to the descrambler 104 which is configured to reverse the effect of any scrambling that may have been done on the data signal prior to its transmission over the fiber path 110. As known in the art, scrambling of outgoing data frames is often performed immediately prior to transmission to ensure adequate clock timing content for downstream regenerators. In one possible embodiment of the invention, the data signals that are received from the fiber path 110 have a format that conforms to the ITU-T G.709 standard, and the descrambler is configured to operate on data signals having such a format. However, the particular data signal format is not relevant to this invention.

The descrambled digital data signal is passed to a decoder 106 where forward error correction code embedded in the data by an encoder at the transmitter is used to detect errors in the digital data signal and correct such errors. In some embodiments, the regenerator 100 may include a deinterleaver after the descambler 104, and may include a plurality of decoders 106, each receiving a unique deinterleaved data signal from the deinterleaver to produce a corrected data signal therefrom. The decoder 106, in one possible embodiment, may be configured to perform forward error correction in conformance with the ITU-T G.709 standard, however the particular embodiment of the decoder 106 is not relevant to this invention.

Corrected data from the decoder 106 is output on a line 112 as regenerated data that ideally conforms to the data that was originally encoded and transmitted from the transmitter located at the opposite end of the fiber path 110.

The corrected data signal from decoder 106 is also provided to the performance monitor 108, along with an uncorrected data signal (on line 114) which has not been subjected to any error correction algorithms. The performance monitor is configured to compare the corrected and uncorrected data signals, and based on differences between the two provide on an output line 116 a signal that is indicative of the number of logic "zeros" that have been corrected relative to the number of logic "ones" that have been corrected.

In this regard, the performance monitor 108 includes a first scrambler 118 that receives the corrected data signal from the decoder 106 and performs the reverse of the operation performed by the descrambler 104 to rescramble the corrected data signal. In embodiments where the regenerator 100 includes a deinterleaver and a plurality of decoders each associated with a deinterleaved data signal the corrected data signals from each of the decoders are passed through a reinterleaver to build an interleaved corrected signal that is then provided to the first scrambler 118. A second scrambler 120 receives the uncorrected data signal and also performs the reverse of the operation performed by the descrambler 104 to rescramble the uncorrected data signal. Again, in embodiments where the regenerator 100 includes a deinterleaver and a plurality of decoders, a reinterleaver is used to rebuild the deinterleaved uncorrected data signals and an interleaved uncorrected data signal is provided as input to the second scrambler 120.

Thus, the uncorrected scrambled signal output from the second scrambler 120 is representative of the raw digital data signal output from the opto/electrical converter 102. In some embodiments, the output of the opto/electrical converter 102 could be used directly as the uncorrected comparison signal by the performance monitor, rather than descrambling and then rescrambling (and in some cases deinterleaving and reinterleaving) the signal, however processing the uncorrected signal as closely as possible in parallel with the corrected signal as illustrated in FIG. 1 simplifies synchronization requirements between the corrected and uncorrected signals.

The scrambled uncorrected digital data signal and the scrambled corrected digital data signal from the second and first scramblers 120, 118, respectively, are both provided to a comparitor 122, where a bit-by-bit comparison between the two signals is performed for a predetermined frame length. Whenever a difference between the uncorrected and corrected signals is detected, the comparitor 122 outputs a signal on a first line 124 to a duty cycle generator 128 if the subject bit has been corrected from an incorrect logic "one" to a logic "zero", or outputs a signal on a second line 126 to the duty cycle generator 128 if the subject bit has been corrected from an incorrect logic "zero" to a logic "one". The duty cycle generator 128 is configured to count the number of incorrect "ones" and "zeros", and output on feedback line 116 a signal representative of the ratio of "ones" and "zeros" that have been corrected by the decoder 106.

In one exemplary embodiment, the data regenerator 100 is configured for use in an Optical Transport Network in which the information structure used to transport data units is an Optical Channel Transport Unit (OTU). Each OTU includes a block of FEC code for correcting up to 160 errors in its associated data unit, and the data regenerator clock speed is such that each block of FEC code has a length of 255 clock cycles. The feedback signal output by the performance monitor 108 is configured to have a period of 510 clock cycles, and thus corresponds to two FEC blocks.

Figure 3A:
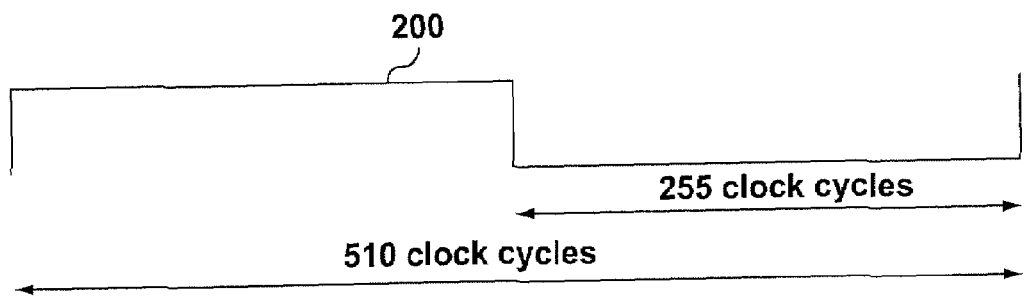
FIGS. 3A–3E show sample feedback signals generated by a performance monitor of the data regenerator.

FIGS. 3A to 3E show sample feedback signal waveforms generated by the duty cycle generator 128. FIG. 3A shows a waveform 200 having a 50% duty cycle in which the signal waveform 200 is high for half (255 cycles) of the clock cycles and low for the other half. In the illustrated embodiment, such a signal indicates that either no errors have been detected or else that the number of erroneous logic "ones" and "zeros" was equal. The duty cycle generator is configured to increase the number of "high" clock cycles during the output waveform a proportionate amount beyond 255 cycles when the incorrect number of logic "ones" exceeds the incorrect number of logic "zeros" and to decrease the number "high" clock cycles during the output waveform a proportionate amount below 255 cycles when the incorrect number of logic "ones" is less than the incorrect number of logic "zeros". In the illustrated embodiment, the maximum offset from the 255 clock cycle center-point of the feedback wave form is plus or minus 160 cycles.

Figure 3B:
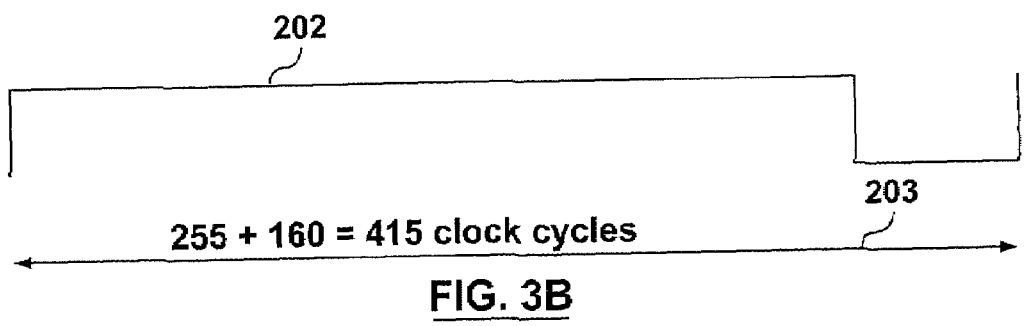
Figure 3C:
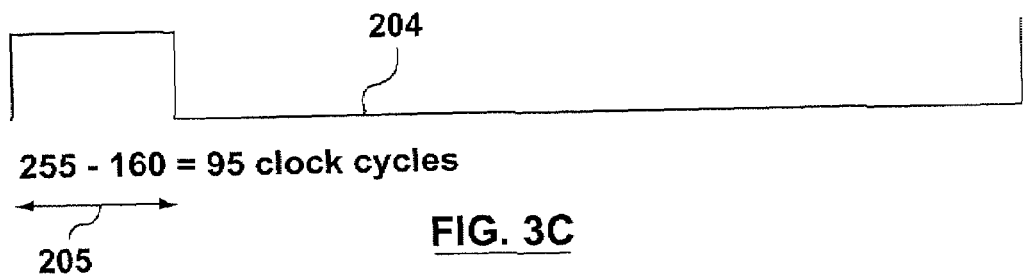
Figure 3D:
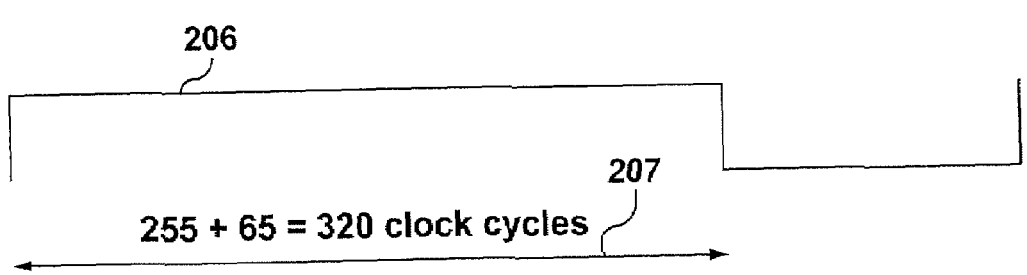
Figure 3E:

FIG. 3B shows a sample feedback signal waveform 202 output on line 116 in a situation where 320 erroneous logic "ones" have been corrected and no logic "zeros" have been corrected. The "high" portion of the waveform 202 has been extended the maximum 160 clock cycles beyond the 255 clock cycle mid point for a total high duration of 415 clock cycles, as indicated by line 203. FIG. 3C shows a sample feedback signal waveform 204 output on line 116 in a situation where 320 erroneous logic "zero" have been corrected and no logic "ones" have been corrected. The "high" portion of the waveform 204 has been reduced the maximum 160 clock cycles from the 255 clock cycle mid-point for a total high duration of 95 clock cycles, as indicated by line 205. FIG. 3D shows a sample feedback signal waveform 206 for the situation where the number of erroneous logic "ones" that have been corrected exceeds the number of erroneous logic "zeros" that have been corrected by 65 (For example, if the number of incorrect "ones" is 85, and the number of incorrect "zeros" is 20). The ratio of this unbalance is represented by extending the "high" portion of the waveform 65 clock cycles beyond the 255 clock cycle mid-point so that it lasts a total of 320 clock cycles, as indicated by line 207. FIG. 3E shows a sample feedback signal waveform 208 for the situation where the number of erroneous logic "zeros" that have been corrected exceeds the number of erroneous logic "ones" that have been corrected by 128 (For example, if the number of incorrect "ones" is 15, and the number of incorrect "zeros" is 143). The ratio of this unbalance is represented by shortening the "high" portion of the waveform 128 clock cycles from the 255 clock cycle mid-point so that it lasts a total of 127 clock cycles, as indicated by line 209. It will of course be appreciated that the feedback waveform could use a number of different formats other than as stated above to convey information about the ratio of incorrect ones and zeros. Among other things, the waveform could correspond to only one, or more that two, blocks of FEC code and different offset limits and cycle lengths could be used dependent on the error correcting capability of the correction code used in any particular implemetation The duty cycle generator 128 outputs a signal waveform on feedback line 116 that is representative of the ratio of incorrect logic "ones" and incorrect logic "zeros" in blocks of data output from the opto/electrical converter 102. Thus, the opto/electrical converter is provided with an indication of the type of errors that are being made ("zeros" instead of "ones" and vice versa). The opto/electrical converter 102 is configured to adjust its "eye" parameters, namely the slicing level V used by the A/D converter 105, to balance the number of incorrect "zeros" and "ones" to an optimal level. For example, in one preferred embodiment of the invention, the slicing voltage V is varied so that the output of the duty cycle generator 128 is shifted towards an 50% duty cycle such as that shown in FIG. 3A. In some embodiments, the optimal balance between corrected "ones" and "zeros" may be something other than an even 1:1 ratio, in which case the eye parameters can be adjusted based on the feedback signal to achieve and maintain the optimal balance. In some embodiments, the feedback signal on line 116 may also be used to also adjust the sampling phase $\phi$ as well as the slicing voltage V of the A/D converter 105 to balance the number of incorrect "zeros" and "ones" to an optimal level.

In a preferred embodiment, the A/D converter 105 includes the appropriate control logic 107 for processing the feedback signal from the performance monitor and controlling the convertor parameters accordingly. However, in some embodiments the control logic for processing the feedback signal could be partially or completely located outside of the opto/electrical convertor. In one embodiment, the control logic 107 includes a sampler to sample the feedback signal on line 116 with a higher clock speed than used to produce the feedback signal in order to determine its duty cycle, and the sampler output used to adjust the slicing level V of the A/D converter 105 to achieve an optical balance between incorrect "ones" and "zeros". In an alternative embodiment, the control logic 107 includes on integrator circuit to which the feedback signal on line 116 is fed into and the output of the integrator circuit is used to control the slicing level V of the A/D converter 105.

In addition to or in place of a duty-cycle waveform, the performance monitor could also be configured to output additional performance information based on the results output from comparitor 122. For example, the duty cycle generator 128 may include counting circuitry having registers for counting the total number of corrected errors and also, the exact count of corrected "zeros" and "ones" occurring in received blocks and outputting such information on one or more count data lines 130 for performance monitoring purposes and/or for use by the opto/electrical converter to optimize its slicing voltage V and/or sampling phase $\phi$. Actual count data can, among other things, be used to distinguish between equal numbers of corrected "ones" and "zeros", and no corrections (the situation shown in FIG. 34).

The generation of information concerning the ratio of corrected "ones" and "zeros" in accordance with the present invention provides a easily implemented method through which the regeneration performance can be monitored and optimized.

The optimization techniques of the present invention could be used with other optimization techniques to control the "eye" parameters fo data recognition. For example, information about the relative number of corrected "ones" and "zeros" output by the performance monitor 108 of the present invention could be used to optimize the bit slicing level V, and information about the total BER used to optimize the sampling phase $\phi$ using techniques such as that shown in U.S. Pat. No. 5,896,391 issued Apr. 20, 1999 to Solheim et al.

Although the invention has been described in connection with certain preferred embodiments, it is not intended to be limited thereto. Rather, the invention includes all embodiments which may fall within the scope of the following claims.

What is claimed is:

1. A data regenerator for regenerating a data signal, comprising:
   a convertor for converting a received data signal into a binary data signal in dependence on conversion parameters;
   a descrambler for descrambline the binary data signal output by the convertor to produce an uncorrected binary data signal;
   an error corrector for correcting errors in the uncorrected binary data signal based on error correction code contained in the uncorrected binary data signal to produce a corrected binary data signal;
   rescrambling means for rescrambling the uncorrected binary data signal and the corrected binary data signal; and
   a performance monitor including a comparitor for performing a bitwise comparison of the rescrambled corrected binary data signal with the rescrambled uncorrected binary data signal to determine information about the relative number of logic "1"s and logic "0"s that have been corrected by the error corrector and output a feedback signal representative of said informationt, and wherein said comparitor aenerates a first signal when the comparitor detects that a logic "1" has been changed to a logic "0" and a second signal when the comparitor detects that a logic "0" has been changed to a loaic "1" by the error corrector, and wherein the performance monitor includesa duty cycle generator responsive to the first and second signals for generating the feedback signal, the feedback signal being indicative of the ratio of corrected logic "1"s to corrected logic "0"s for predetermined durations of the data signal,
   wherein the convertor adjusts at least some of the conversion parameters in dependance on the feedback signal.

2. The data regenerator of claim 1 wherein the adjusted conversion parameters include a slicing level for the received data signal to distinguish between a logic "1" and a logic "0".

3. The data regenerator of claim 2 wherein the adjusted conversion parameters include a sampling phase.

4. The data regenerator of claim 2 wherein the received data signal is an optical data signal transmitted over a fiber path and the converter includes an opto/electrical transducer for converting the received data signal into an electrical data signal.

5. The data regenerator of claim 4 wherein the converter includes an analog to digital convertor for sampling an analog electrical signal output from the opto/electrical transducer in dependence on the slicing level to produce the binary data signal.

6. The data regenerator of claim 5 wherein the analog to digital convertor has a sampling phase that is adjusted in dependence on the feedback signal.

7. The data regenerator of claim 1 wherein the adjusted conversion parameters are adjusted with respect to achieving a threshold balance in the ratio of corrected logic "1"s and "0"s.

8. The data regenerator of claim 1 wherein the performance monitor includes counting means for counting a number of logic "1"s and a number of logic "0"s that have been corrected by the error corrector far a predetermined duration of the binary data signal, and outputting signals representative of the number of corrected logic "1"s and corrected logic "0"s.

9. A method for regenerating a binary data signal comprising:
   converting a received data signal into a binary data signal according to conversion parameters;
   descrambling the binary data signal output to produce an uncorrected binary data signal;
   detecting and correcting errors in the uncorrected binary data signal based on detection and correction code included in the uncorrected binary data signal to produce a corrected binary data signal;
   comparing the corrected binary data signal with an uncorrected representation of the binary data signal to determine information about the relative number of logic "1"s and "0"s that have been corrected, wherein the step of comparing includes rescrambling the uncorrected binary data signal and the corrected binary data signal, performing a bitwise comparison of the rescrambled corrected binary data signal and the rescrambled uncorrected representation of the binary data signal and generating a first signal when the detecting step detects that a logic "1" has been changed to a logic "0" and a second signal when the detecting step detects that a logic "0" has been chanaed to a logic "1; and
   adjusting at least one of the conversion parameters in dependence on the determined information.

10. The method of claim 9 wherein the received data signal is an optical data signal, including converting the optical data signal into an analog electrical signal and sampling the analog electrical signal in accordance with a sampling phase to determine, relative to a threshold slicing level, if the samples represent logic "1"s or logic "0"s, to produce the binary data signal.

11. The method of claim 10 including adjusting the threshold slicing level in dependence on the determined information.

12. The method of claim 11 including adjusting the sampling phase in dependence on the determined information.

13. The method of claim 9 wherein the conversion parameters are adjusted with respect achieving a threshold balance in the ratio of corrected logic "1"s and "0"s.

14. The method of claim 9 wherein the received data signal includes a plurality of data frames formatted as Optical Transport Units, including a generating a duty cycle wave-form having successive periods, each period being representative of the ratio of corrected logic "1"s and "0"s in at least one of the data frames.

15. A performance monitoring device for monitoring the performance of a data regenerator that corrects a received data signal based on forward error correction information contained in the received data signal, comprising:
   rescrambler means for rescrambling an unscrambled corrected binary data signal and for rescrambling an unscrambled uncorrected binary data signal;
   comparison means for receiving the rescrambled corrected binary data signal and the rescrambled uncorrected binary data signal from the rescrambler means and performing a bit-by-bit comparison of the rescrambed corrected and uncorrected binary data signals to determine when a logic "1" has been corrected to a logic "0" and when a logic "0" has been corrected to a logic "1" by the data regenerator; and
   signal generating means responsive to the comparison means for generating a duty-cycle waveform representative of the ratio of corrected logic "1"s and logic "0"s for a data signal of a predetermined length.

16. The performance monitoring means of claim 15 wherein the signal generating means includes means for counting a number of corrected logic "1"s and a number of corrected logic "0"s for a data signal of a predetermined length, and outputting signals representative of said number of corrected logic "1"s and said number of corrected logic "0"s.

* * * * *

UNITED STATES PATENT AND TRADEMARK OFFICE
CERTIFICATE OF CORRECTION

| | |
|---|---|
| PATENT NO. | : 7,062,165 B2 |
| APPLICATION NO. | : 10/025795 |
| DATED | : June 13, 2006 |
| INVENTOR(S) | : Patrice Brissette and Sandy A. Thomson |

It is certified that error appears in the above-identified patent and that said Letters Patent is hereby corrected as shown below:

Column 7
In claim 1, at line 7, the word "descrambline" should read --decrambling--.

Column 7
In claim 1, at line 24, the word "annorates" should read --generates--.

Column 7
In claim 1, at line 28, the word "loaic" should read --logic--.

Column 7
In claim 1, at line 29, the word "includesa" should read --includes a--.

Column 7
In claim 8, at line 64, the word "far" should read --for--.

Column 8
In claim 9, at line 23, the word "chanaed" should read --changed--.

Signed and Sealed this

Twenty-first Day of November, 2006

JON W. DUDAS
*Director of the United States Patent and Trademark Office*